(12) United States Patent
Hood et al.

(10) Patent No.: US 10,403,909 B2
(45) Date of Patent: Sep. 3, 2019

(54) FLUID FLOW PLATE FOR A FUEL CELL

(71) Applicant: INTELLIGENT ENERGY LIMITED, Loughborough, Leicestershire (GB)

(72) Inventors: Peter David Hood, Loughborough (GB); Paul Leonard Adcock, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 369 days.

(21) Appl. No.: 14/655,751

(22) PCT Filed: Dec. 18, 2013

(86) PCT No.: PCT/GB2013/053344
§ 371 (c)(1),
(2) Date: Jun. 26, 2015

(87) PCT Pub. No.: WO2014/102533
PCT Pub. Date: Jul. 3, 2014

(65) Prior Publication Data
US 2015/0349353 A1    Dec. 3, 2015

(30) Foreign Application Priority Data
Dec. 27, 2012  (GB) .................................. 1223453.0

(51) Int. Cl.
*H01M 8/0258* (2016.01)
*H01M 8/0271* (2016.01)
(Continued)

(52) U.S. Cl.
CPC ......... *H01M 8/0258* (2013.01); *H01M 8/026* (2013.01); *H01M 8/0263* (2013.01);
(Continued)

(58) Field of Classification Search
None
See application file for complete search history.

(56) References Cited

U.S. PATENT DOCUMENTS

| 3,575,719 A | * | 4/1971 | Nelson et al. | ...... H01M 8/0273 204/246 |
| 7,014,939 B2 | * | 3/2006 | Suenaga | ............ H01M 8/0273 429/465 |

(Continued)

FOREIGN PATENT DOCUMENTS

| CN | 1945888 A | 4/2007 |
| DE | 102004043513 A1 | 4/2005 |

(Continued)

OTHER PUBLICATIONS

Great Britain Patent Application No. 1223453.0; Search Report; dated Jan. 18, 2013; 3 pages.
(Continued)

*Primary Examiner* — Helen Oi K Conley
(74) *Attorney, Agent, or Firm* — BakerHostetler

(57) ABSTRACT

The invention relates to bipolar plates for electrochemical fuel cell assemblies, and in particular to configurations of bipolar plates allowing for multiple fluid flow channels for the passage of anode, cathode and coolant fluids. Embodiments disclosed include a bipolar plate (10) for an electrochemical fuel cell assembly, comprising: a first plurality of fluid flow channels (13) extending across a first face of the bipolar plate between first inlet and outlet ports (18a, 18b) at opposing ends of the bipolar plate; a second plurality of fluid flow channels (22) extending across a second opposing face of the bipolar plate between second inlet and outlet ports (21a, 21b) at opposing ends of the bipolar plate; and a third plurality of fluid flow channels (14) extending between third inlet and outlet ports (19a, 19b) at opposing ends of the bipolar plate, the third plurality of fluid flow
(Continued)

channels provided between first and second corrugated plates (11, 12) forming the first and second opposing faces of the bipolar plate, wherein the first, second and third fluid flow channels are coplanar.

11 Claims, 18 Drawing Sheets

(51) Int. Cl.
  *H01M 8/026* (2016.01)
  *H01M 8/0263* (2016.01)
  *H01M 8/0206* (2016.01)
  *H01M 8/0267* (2016.01)
  *H01M 8/1018* (2016.01)

(52) U.S. Cl.
  CPC ........ *H01M 8/0271* (2013.01); *H01M 8/0206* (2013.01); *H01M 8/0267* (2013.01); *H01M 2008/1095* (2013.01)

(56) References Cited

U.S. PATENT DOCUMENTS

| | | | |
|---|---|---|---|
| 7,291,414 | B2 | 11/2007 | Goebel et al. |
| 2002/0122970 | A1* | 9/2002 | Inoue ................ B29C 45/14344 264/154 |
| 2004/0096716 | A1* | 5/2004 | Pierpont ................... F28F 3/12 429/435 |
| 2005/0058864 | A1 | 3/2005 | Goebel et al. |
| 2007/0082252 | A1 | 4/2007 | Goebel et al. |
| 2007/0111063 | A1 | 5/2007 | Nietsch et al. |
| 2011/0212385 | A1 | 9/2011 | Naoki |

FOREIGN PATENT DOCUMENTS

| | | |
|---|---|---|
| JP | 2002-100381 A | 4/2002 |
| JP | 2005-235555 A | 9/2005 |
| JP | 2007-109652 A | 4/2007 |
| JP | 2007-200700 A | 8/2007 |
| JP | 2010-218771 A | 9/2010 |
| JP | 2011-009062 A | 1/2011 |
| WO | WO 2010/084624 A1 | 7/2010 |

OTHER PUBLICATIONS

International Patent Application No. PCT/GB2013/053344; Int'l Search Report and Written Opinion; dated Mar. 17, 2014; 8 pages.
International Search Report and Written Opinion dated Mar. 17, 2014 in International Application No. PCT/GB2013/053344.

* cited by examiner

FLUID FLOW PLATE FOR A FUEL CELL

CROSS-REFERENCE TO RELATED APPLICATIONS

This application is a National Stage of International Patent Application No. PCT/GB2013/053344, filed Dec. 18, 2013 and claims priority to foreign application GB 1223453.0, filed Dec. 27, 2012, the contents of which are incorporated herein by reference in their entirety.

The invention relates to fluid flow plates for electrochemical fuel cell assemblies, and in particular to configurations of bipolar plates allowing for multiple fluid flow channels for the passage of anode, cathode and coolant fluids.

The use of bipolar, as opposed to unipolar, plates in electrochemical fuel cells allows for a reduction in thickness and consequently overall size of the fuel cell, due to the use of shared electrical connections between the anode plate of one cell and the cathode plate of an adjacent cell. Conventional bipolar plates may for example be formed from a single sheet of metal, with machined or pressed features on opposing faces to allow for the passage of fuel and oxidant.

In so-called 'open cathode' fuel cell assemblies, cathode fluid flow channels allow for free passage of air through the fuel cell assembly, which functions both to supply oxidant to the individual cells and to provide cooling. A problem with such arrangements is that the fuel cell assembly needs large amounts of forced air to achieve both functions, and the cathode channels therefore need to be large to accommodate sufficient air flow. Reducing the size of such assemblies can be difficult, as the efficiency of cooling by such means can be compromised by making the cathode channels smaller.

The use of so-called 'closed cathode' fuel cell assemblies addresses the problem of forced air cooling by instead using dedicated coolant channels provided within the bipolar plate, while the cathode channels function mainly to provide oxidant. Such coolant channels may be provided by mating a pair of pre-machined plates together to provide channels running between the plates. This arrangement allows for coolant fluid, typically water, to be passed through a bipolar plate when in use, which greatly increases the efficiency of cooling compared to forced air cooling in open cathode assemblies.

A problem with such closed cathode assemblies, however, is that the complexity of each individual cell is increased due to the need for additional coolant channels. This can result in an increase, rather than a decrease, in the overall size of each cell. This also results in an increased cost for manufacturing each cell.

Other problems to be addressed in fuel cell assemblies include: ensuring a uniform flow field for fluid distribution in fuel, oxidant and coolant lines; minimising the pressure drop across inlet manifolds; minimising the sealing pressure required to ensure gas-tight operation; making the construction of a bipolar plate compatible with mechanised assembly processes, given the large number of units that need to be assembled with precision in manufacturing a fuel cell assembly; reducing the pitch of the fuel cells making up a stack while maintaining operation within desired parameters; reducing the number of components; reducing the overall weight; reducing material usage and wastage; simplifying the design, manufacture and assembly; and in general reducing the overall cost of a fuel cell assembly.

It is an object of the invention to address one or more of the above mentioned problems.

In accordance with a first aspect of the invention there is provided a bipolar plate for an electrochemical fuel cell assembly, comprising:
   a first plurality of fluid flow channels extending across a first face of the bipolar plate between first inlet and outlet ports at opposing ends of the bipolar plate;
   a second plurality of fluid flow channels extending across a second opposing face of the bipolar plate between second inlet and outlet ports at opposing ends of the bipolar plate; and
   a third plurality of fluid flow channels extending between third inlet and outlet ports at opposing ends of the bipolar plate, the third plurality of fluid flow channels provided between first and second corrugated plates forming the first and second opposing faces of the bipolar plate,
   wherein the first, second and third channels are coplanar.

An advantage of forming each of the fluid flow channels in a pair of corrugated plates such that the channels are coplanar is that the overall thickness of the bipolar plate can be substantially reduced while maintaining a high output power and cooling capacity.

The first and second corrugated plates may be engaged with each other such that selected corrugations in the first plate lie within corresponding corrugations in the second plate. This has the advantage of both ensuring that the plates are accurately registered with one another and to allow for coolant channels to be formed between the plates through engineering of the corrugations in the plates.

The third plurality of fluid flow channels may be formed in various ways between the first and second corrugated plates, such as by omission of selected corrugations in the first or second plate, by narrowing of selected corrugations in the first or second plate, or by a height reduction of selected corrugations in the first or second plate. Each of these has the advantage that optimum balance between coolant, fuel and oxidant flow through the fluid flow channels can be achieved by means of the shape and distribution of corrugations in one or both of the plates.

In certain embodiments, the third, or coolant, channels may be provided by alternate corrugations formed in the first or second corrugated plate and the second or first plate having alternate omitted corrugations.

Adjacent pairs of the first, or anode, fluid flow channels may be connected at opposing ends of the bipolar plate to form a serpentine fluid flow path extending across the first face of the bipolar plate between the first inlet and outlet ports. The advantage of a serpentine path is that this ensures the delivery of a uniform flow of fuel across the anode side of the bipolar plate. A serpentine path for the second, or cathode, fluid flow channels may also or alternatively be provided, but this is less advantageous because a non-uniformity in the supply of oxidant to the cathode side can be accommodated through an excess in air supply without substantially affecting the efficiency of operation.

To form the serpentine path, the first fluid flow channels may be connected by transverse fluid communication paths extending between adjacent corrugations in the first corrugated plate.

The second fluid flow channels, with or without the first fluid flow channels being in a serpentine path, may be provided in the form of an array of interdigitated fluid flow channels. The interdigitated fluid flow channels allow for selected channels to form inlet channels while others form outlet channels. The second face may comprise barriers provided at opposing ends of the interdigitated fluid flow channels, each barrier configured to form a fluid seal between an adjacent longitudinal fluid flow channel and an adjacent one of the second inlet and outlet ports.

Inlet and outlet manifolds may be provided across the first and/or second faces of the bipolar plate, the manifolds providing fluid connections between the respective inlet and outlet ports and the corresponding plurality of fluid flow channels. A gasket may be provided to form a fluid seal around a periphery of the first and/or second faces of the bipolar plate and the respective inlet and outlet ports, the gasket forming the corresponding inlet and outlet manifolds. The inlet and outlet manifolds may each comprise an open array of raised features formed in the first gasket, the raised features thereby forming a defined separation between adjacent bipolar plates and an intervening membrane electrode assembly when formed into a fuel cell stack.

The bipolar plate may further comprise third inlet and outlet manifolds between the first and second corrugated plates, providing respective fluid connections between the third inlet and outlet ports and the third plurality of fluid flow channels. A third gasket may be provided forming a fluid seal around a periphery of the bipolar plate between the first and second corrugated plates and around the third inlet and outlet ports and comprising the third inlet and outlet manifolds. The third inlet and outlet manifolds may each comprise an open array of raised features formed in the third gasket, the raised features defining a separation between the first and second corrugated plates to allow for fluid flow therebetween. The first, second and third inlet and outlet manifolds or combinations thereof may partially or entirely overlap one another.

In accordance with a second aspect of the invention there is provided a method of manufacturing a bipolar plate for an electrochemical fuel cell assembly, the method comprising:
  press-forming a first metallic plate to form first second and third inlet and outlet ports at opposing ends and a plurality of corrugations to provide a first plurality of fluid flow channels extending across the first metallic plate between the first inlet and outlet ports;
  press-forming a second metallic plate to form first second and third inlet and outlet ports at opposing ends and a plurality of corrugations to provide a second plurality of fluid flow channels extending across the second metallic plate between the second inlet and outlet ports;
  joining the first and second metallic plates to form a bipolar plate having a third plurality of fluid flow channels between adjoining faces of the first and second metallic plates extending between the third inlet and outlet ports at opposing ends of the bipolar plate, wherein the first, second and third fluid flow channels are coplanar.

The steps of press-forming the first and second metallic plates may be performed simultaneously on a common metallic plate. The method may further comprise forming a fold line between the first and second metallic plates, the step of joining the first and second metallic plates comprising folding the common metallic plate along the fold line.

Aspects and embodiments of the invention are described in further detail below by way of example and with reference to the enclosed drawings in which:

FIG. 11b is a perspective view of a cathode side of the bipolar plate of FIG. 11a;

FIGS. 1 to 10 illustrate a first type of bipolar plate, in which an anode fluid flow field across a face of the plate is in the form of an arrangement of parallel tracks or channels. FIGS. 11 to 15 illustrate a second type of bipolar plate, in which the anode fluid flow field is in the form of a single serpentine track or channel across the face of the plate. These different embodiments require different arrangements of channels in the bipolar plate, as described in further detail below.

Figure 1:
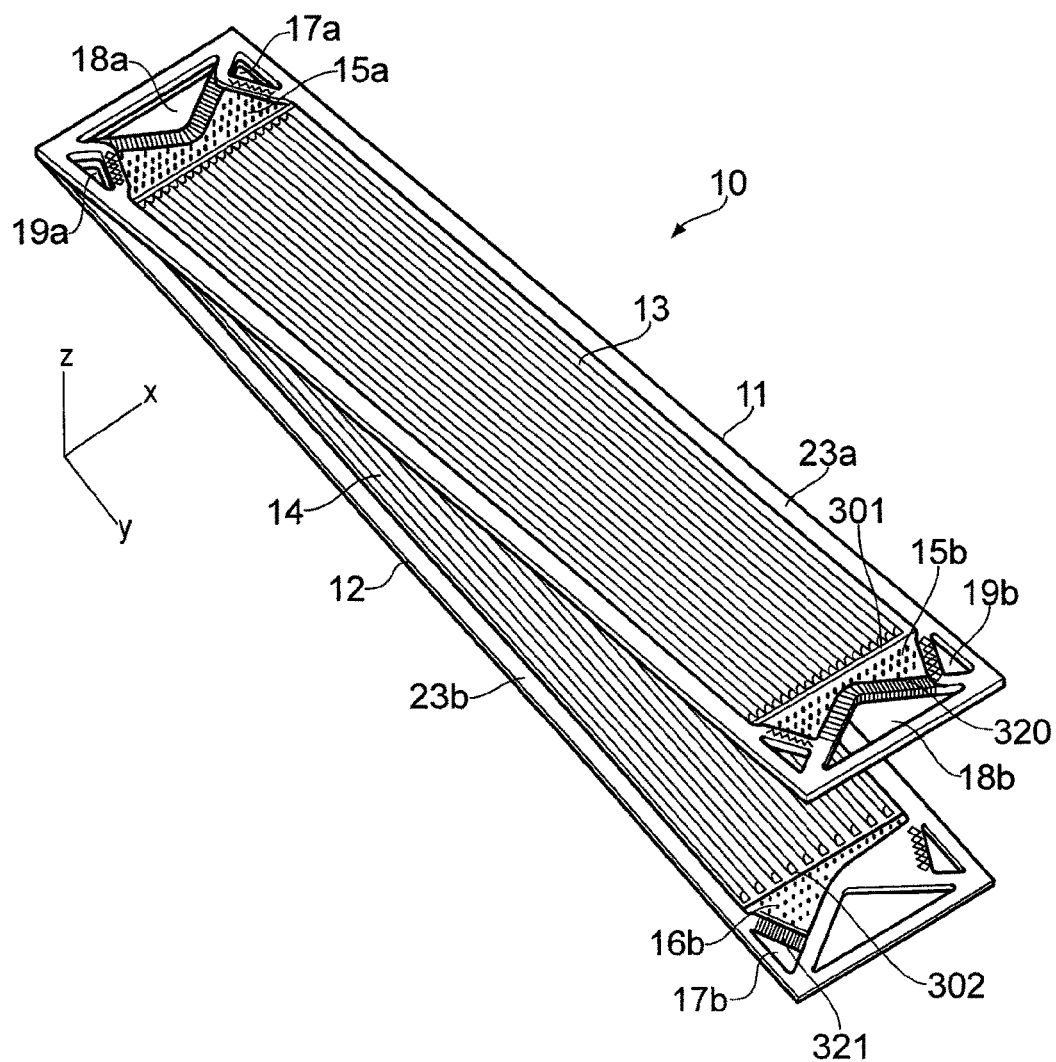
FIG. 1 is a perspective view of a bipolar plate separated to show internal coolant manifold and fluid flow channels, and external cathode manifold and fluid flow channels.
Figure 2:
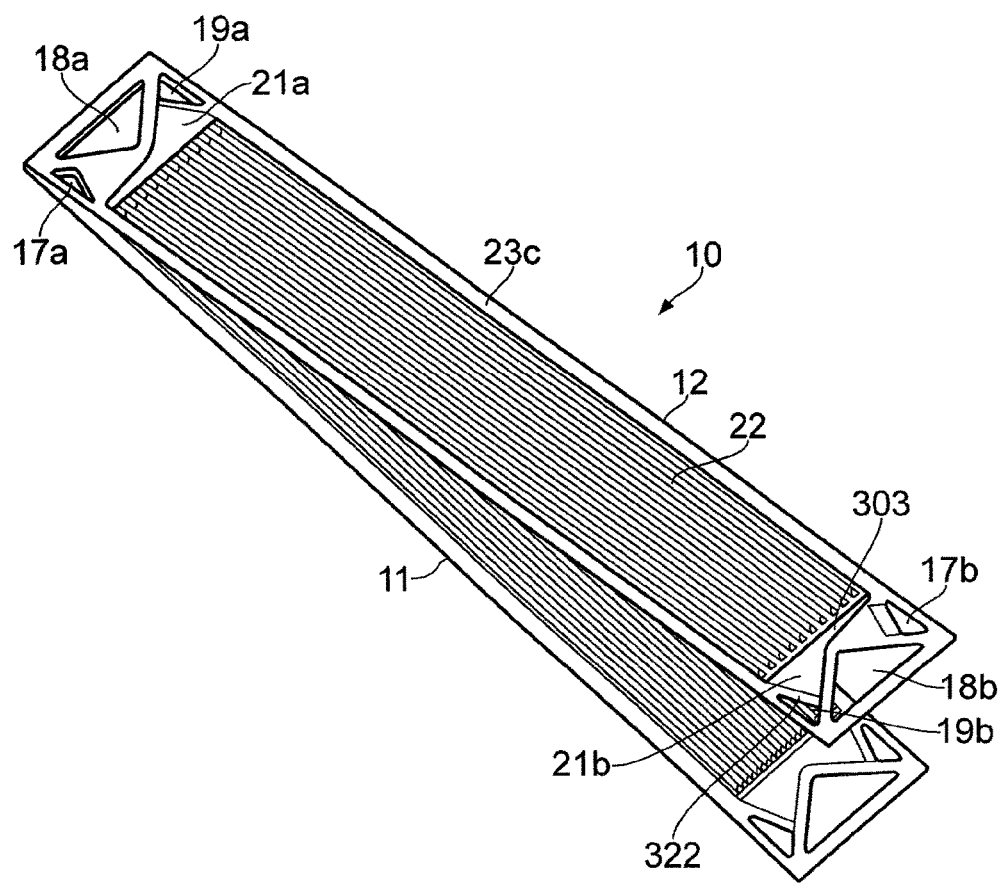
FIG. 2 is a perspective view of the reverse face of the bipolar plate of FIG. 1, showing anode manifold and fluid flow channels.

FIGS. 1 and 2 show perspective views of an embodiment of a bipolar plate 10. The bipolar plate 10 comprises first and second corrugated plates 11, 12 that engage together to form the assembled bipolar plate 10. The first plate 11 comprises a first plurality of fluid flow channels 13 across a first face of the bipolar plate 10, in the form of corrugations extending between first inlet and outlet ports 18a, 18b at opposing ends of the bipolar plate. In the arrangement shown, these ports 18a, 18b are used for the flow of cathode fluid, i.e. oxidant, through the assembled fuel cell formed from a stack of such plates. The first plurality of fluid flow channels 13 formed by the corrugations may be alternatively described as cathode fluid flow channels. A cathode manifold or gallery 15a, 15b is provided at each end of the plate 10 connecting the respective ports 18a, 18b and the fluid flow channels 13. The manifolds or galleries 15a, 15b serve to distribute fluid flowing into and out of the stack through the ports 18a, 18b among the fluid flow channels 13 with a minimum pressure differential across the width of the plate 10, so as to achieve a uniform flow of fluid along the channels 13.

Second inlet and outlet ports 19a, 19b are provided at opposing ends of the bipolar plate 10 for flow of fluid into and out of the plate and along a second plurality of fluid flow channels 22 provided on a second opposing face of the bipolar plate 10, as shown in the reverse view of the plate in FIG. 2. These second fluid flow channels 22 may be described as anode fluid flow channels, and the ports 19a, 19b as anode ports, for the distribution of fuel gas through and across the bipolar plate 10. Anode manifold regions or galleries 21a, 21b are provided connecting the anode inlet and outlet ports 19a, 19b to the second plurality of fluid flow channels 22.

Third inlet and outlet ports 17a, 17b are also provided in the plate 10 for the transmission of coolant fluid, such as water, into and out of the bipolar plate 10 when assembled into a fuel cell stack. These ports 17a, 17b communicate, via coolant manifolds or galleries (only gallery 16b is visible), with a third plurality of fluid flow channels 14 extending between the third inlet and outlet ports 17a, 17b at opposing ends of the bipolar plate 10. The third plurality of fluid flow channels 14 are provided between the first and second corrugated plates 11, 12 forming the first and second opposing faces of the bipolar plate 10. In the embodiment illustrated in FIGS. 1 and 2, corrugations making up the third plurality of fluid flow channels 14, i.e. the coolant channels, are provided by engagement of the reverse sides of the corrugations in the plates 11, 12 making up the first and second plurality of fluid flow channels. This is illustrated in further detail in FIG. 7, described below.

The form of the bipolar plate 10 may be fabricated from a single press-formed corrugated metal plate comprising the first (or cathode) plate 11 and the second (or anode) plate 12, which may be connected via a fold line. The plates 11, 12 can then be folded together along the adjoining fold line to interleave the corrugations forming the third set of fluid flow channels between the plates 11, 12. The press-forming process can also form the ports 17a, 17b, 18a, 18b, 19a, 19b in the same step as forming the fluid flow channels 13, 14, 22.

Applied to faces of each of the corrugated plates 11, 12 making up the bipolar plate 10 are gaskets 23a, 23b, 23c, which act to provide fluid seals around the periphery of the opposing outer faces of the bipolar plate 10 and between the first and second corrugated plates 11, 12. The gaskets 23a, 23b, 23c are preferably provided in the form of moulded elastomeric material applied to the faces of the corrugated plates 11, 12. As well as providing fluid seals around the periphery of the plate 10, and around the periphery of each of the inlets and outlets, the moulded gasket material provides additional surface detail to form the inlet and outlet manifolds for each of the fluid flow channels 13, 14, 22, as shown in further detail in subsequent figures. The patterns in the moulded gaskets 23a, 23b, 23c allow for conduction of air, fuel (hydrogen) and coolant (water) to be directed from inlet ports to the relevant channels formed in and between the plates 11, 12 and from these channels to exhaust ports. The plates 11, 12 illustrated in FIG. 1 and subsequent figures are symmetrical, so the ports 17a, 18a, 19a or 17b, 18b, 19b can be considered either inlet or outlet ports. Flow of fluid from each inlet port to the corresponding outlet port can be in a common direction or in different directions, depending on the particular implementation.

The anode and cathode manifolds 21a, 21b, 15a, 15b are each shaped to minimise the pressure drop across the width of the flow fields.

Figure 3:
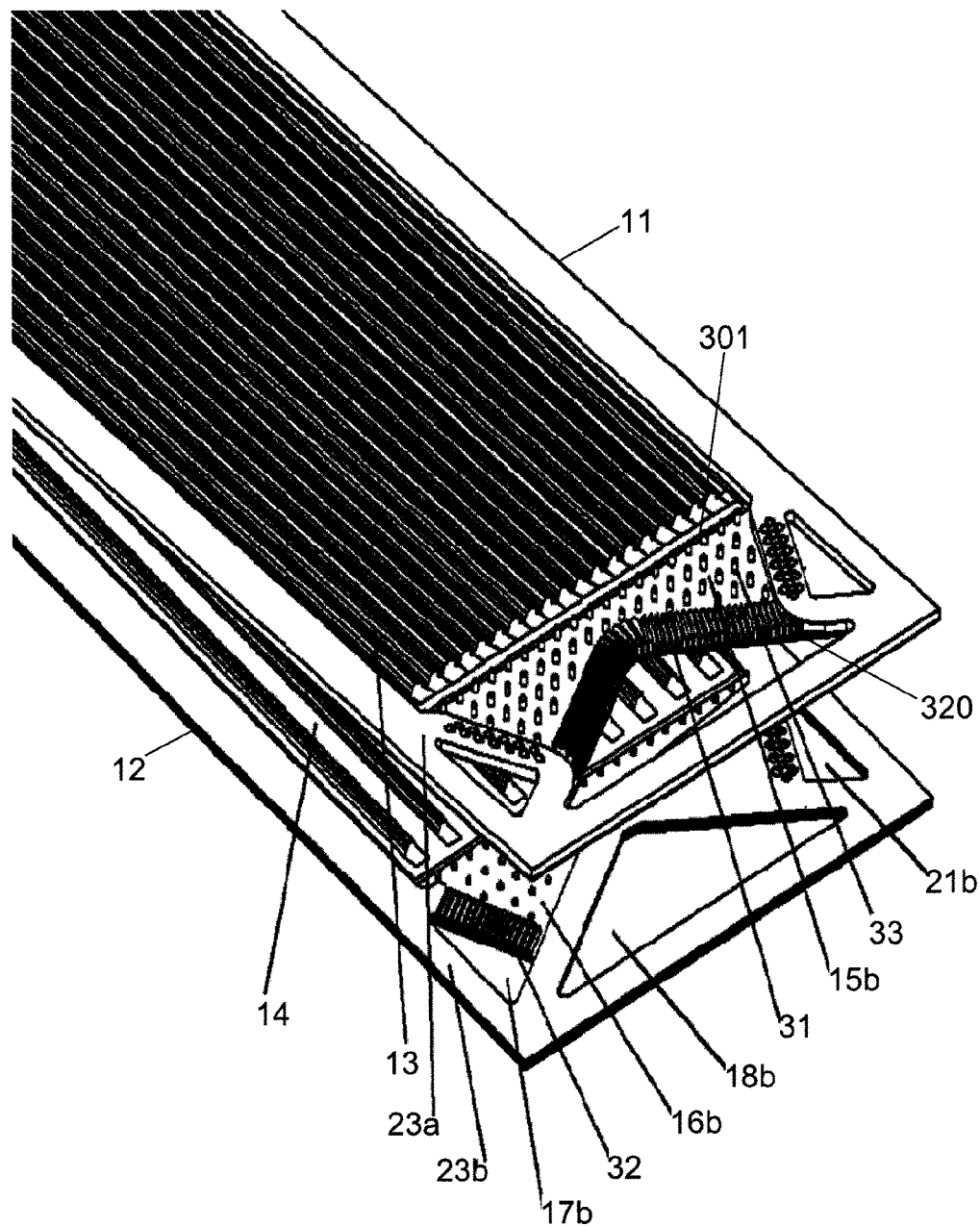
FIG. 3 is a magnified view of the coolant and cathode manifolds and flow channels of the bipolar plate of FIG. 1.

FIG. 3 illustrates a magnified view of one end of the bipolar plate 10 of FIG. 1, showing the cathode manifold or gallery 15b and the coolant manifold or gallery 16b. The cathode manifold 15b comprises an open array of raised features formed in the gasket material, the raised features being configured to provide a defined separation between the bipolar plate and an adjacent layer (which in this case is the membrane-electrode assembly, or MEA) while allowing a flow of fluid between the cathode port 18b and the fluid flow field 13 formed by corrugations in the first plate 11. In the embodiment shown, a castellated region 31 of the cathode manifold 15b is disposed along an edge of the manifold region 15b adjoining the port 18b, the castellated region 31 serving to direct the flow of fluid into or out of the manifold 15b while maintaining a required separation along the edge of the manifold region 15b. In the space between the castellated region and the cathode fluid flow field 13, the manifold 16b comprises an array of projections 33 in the gasket material configured to allow free flow of fluid into or out of the corrugations 13.

Figure 4:
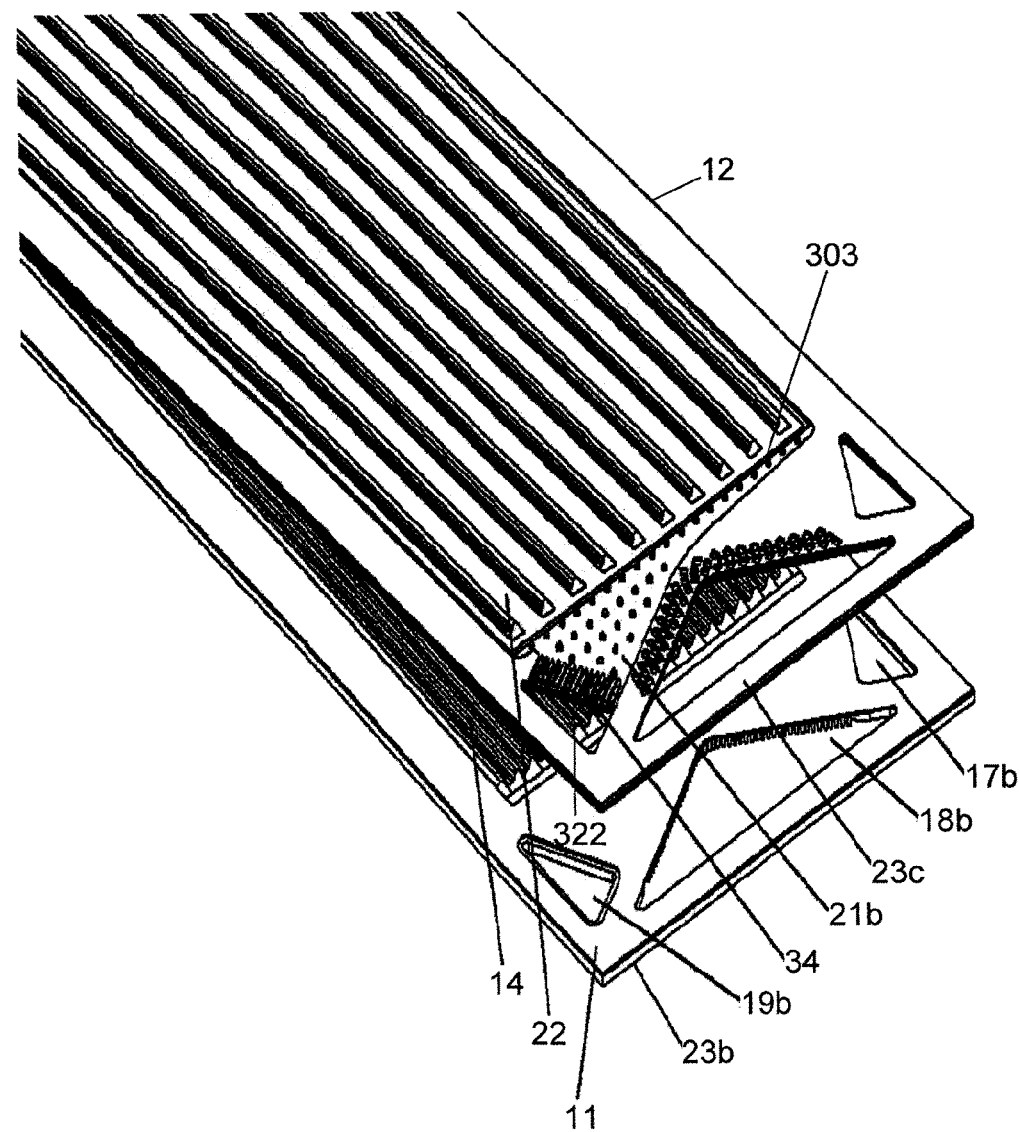
FIG. 4 is a magnified view of the anode manifold and fluid flow channels of the bipolar plate of FIG. 2.

A similar arrangement of raised features in the gasket material is provided for the coolant manifold 16b and for the anode manifold 21b, as illustrated in FIG. 4. Each of the manifolds 15b, 16b, 21b is provided with a castellated region 31, 32, 34 adjacent the corresponding port 18b, 17b, 19b and with arrays of projections in the moulded gasket between the port 17b, 19b and the fluid flow field 22, 14. Each of the manifolds is shaped to minimise a pressure difference across the corresponding flow field and to maximise the inlet and outlet area. The combination of generally triangular shaped ports with shaped manifolds allows for an optimum use of area at each end of the generally rectangular bipolar plate.

Figure 5:
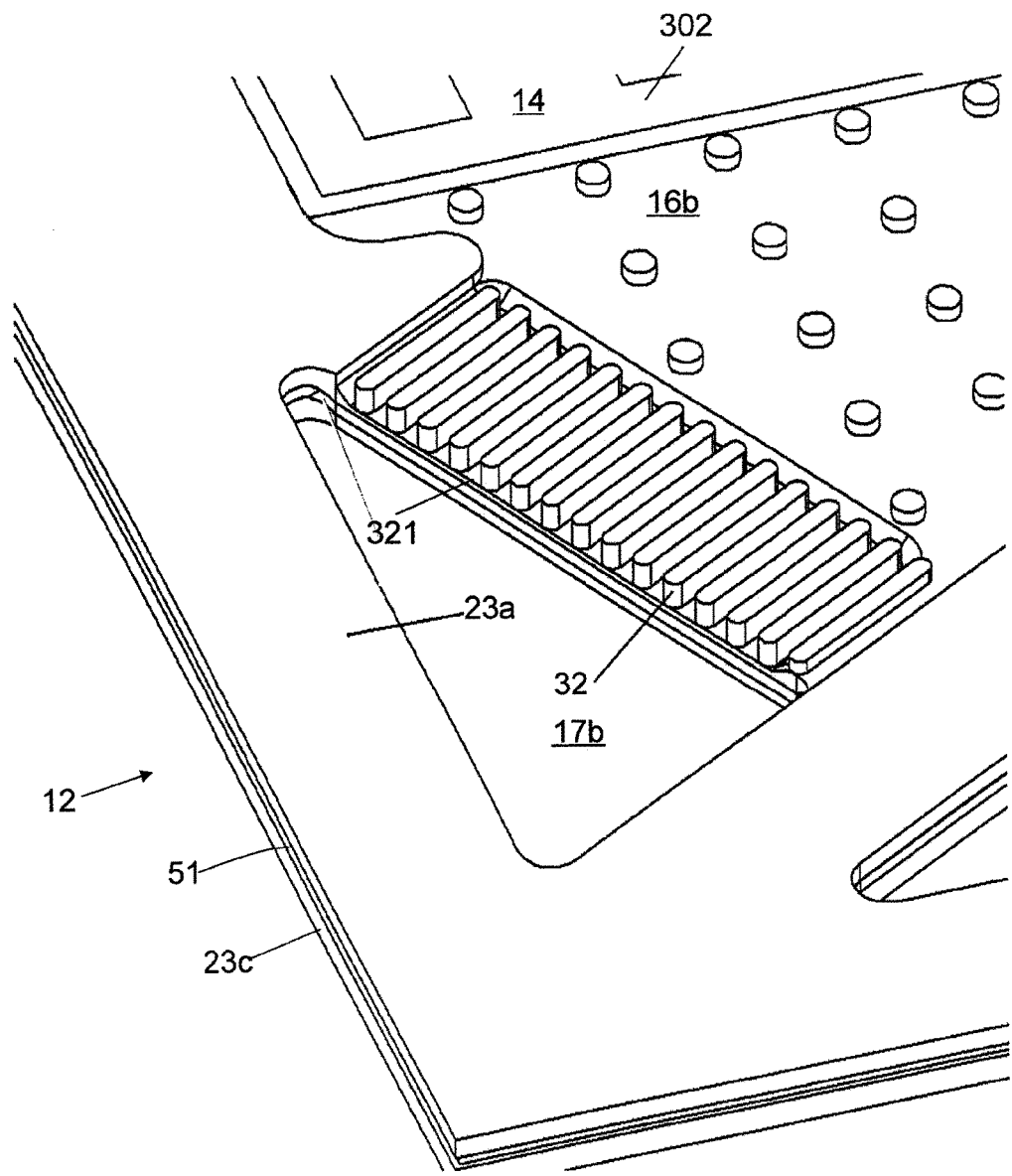
FIG. 5 is a detailed view of a coolant port manifold in one of the corrugated plates making up a bipolar plate.
Figure 6:
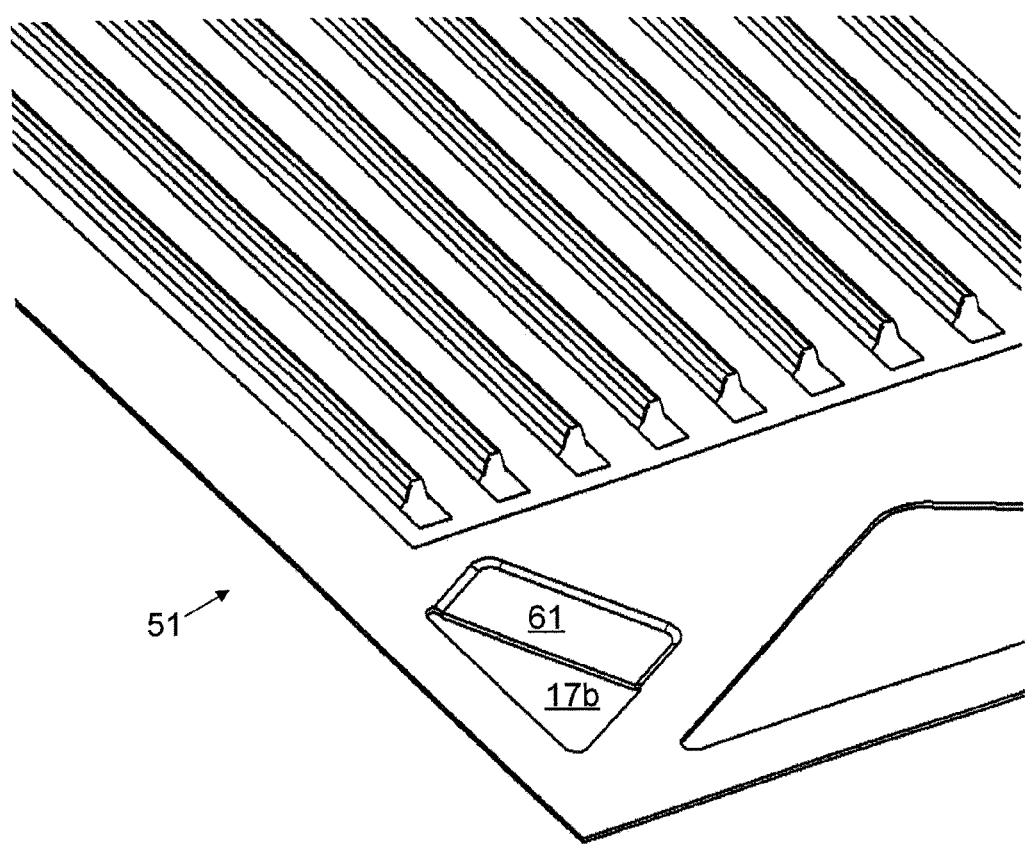
FIG. 6 is a detailed view of the underlying corrugated plate in the detailed view of FIG. 5.

Illustrated in FIG. 5 is a more detailed perspective view of a region of the second plate 12 around the coolant port 17b, showing the castellated region 32 in the manifold region along the edge of the port 17b between the port 17b and the coolant fluid flow field 14.

The corrugated plate 12 comprises a central metallic plate 51 having a moulded gasket 23a, 23c applied on opposing faces. The moulded gasket 23a on one face of the metallic plate 51 comprises the manifold 16b with the castellated region 32 along an edge adjoining the port 17b. The gasket material is thicker over the castellated region 32 of the manifold 16b compared with the periphery of the plate 12, to allow for a larger cross-sectional area for fluid to enter or exit the manifold. This is made possible by offsetting the metallic plate 51 under the castellated region 32. This is illustrated more clearly in FIG. 6, which shows the metallic plate 51 without the gasket layers 23a, 23c applied. An offset is provided in the plate 51 by means of a debossed region 61 extending across an edge of the coolant port 17b. A similar arrangement may be applied in relation to the cathode and anode ports and manifolds.

Figure 7:
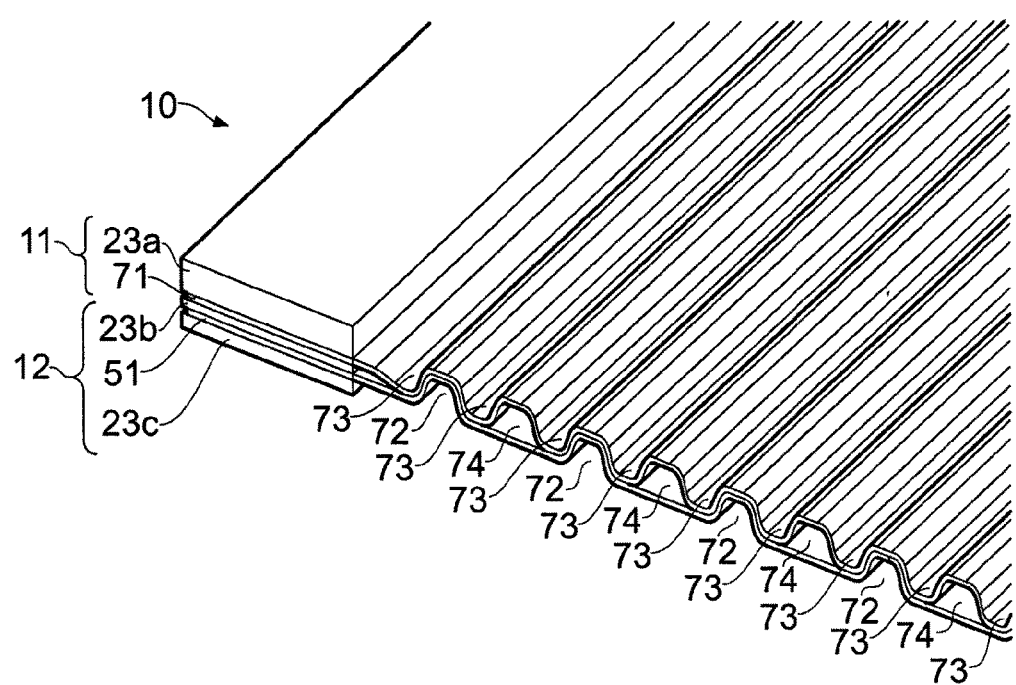
FIG. 7 is a sectional view transverse the fluid flow field region of a bipolar plate, showing the arrangement of interengaging corrugations in the first and second corrugated plates making up the anode, cathode and coolant fluid flow channels.

FIG. 7 illustrates a transverse sectional view across the bipolar plate 11, indicating the arrangement of corrugations allowing for fluid flow channels across the anode, cathode and coolant fluid flow fields to be coplanar. Anode fluid flow channels 72 are provided by corrugations in the second corrugated plate 12, comprising the metallic plate 51 and gasket layers 23b, 23c. Cathode fluid flow channels 73 are provided by corrugations in the first corrugated plate 11, comprising metallic plate 71 and the gasket layer 23a. The gasket layer 23b may instead be applied to the first corrugated plate 11 to achieve the same result.

Coolant channels 74 are provided by openings in the space between the metallic plates 71, 51 of the first and second corrugated plates 11, 12. In the embodiment illustrated, the coolant channels 74 are formed between the first and second corrugated plates 11, 12 by omission of selected corrugations in the second plate 12. The same effect may be achieved by omission of selected corrugations in the first plate 11. The coolant channels are preferably uniformly distributed across the width of the bipolar plate 10, and provided by omission of alternate corrugations in the second plate 12. In alternative arrangements, the coolant channels may be formed between the first and second corrugated plates by narrowing or by a height reduction of selected corrugations in the first or second plate.

The arrangement of coolant channels in the bipolar plate allows for an efficient use of both space and material, since the corrugations providing fluid flow channels in the anode and cathode sides of the plate also serve to define a further set of fluid flow channels for coolant between the corrugated plates.

The channels 72, 73, 74 on and between the corrugated plates 51, 71 are shown in FIG. 7 as being parallel to each other and substantially uniform along the length of the bipolar plate 10. In alternative embodiments, the channels may be non-parallel and may for example be tapered or varied in dimensions to account for expected pressure or temperature variations across the bipolar plate 10 in use.

Figure 8:
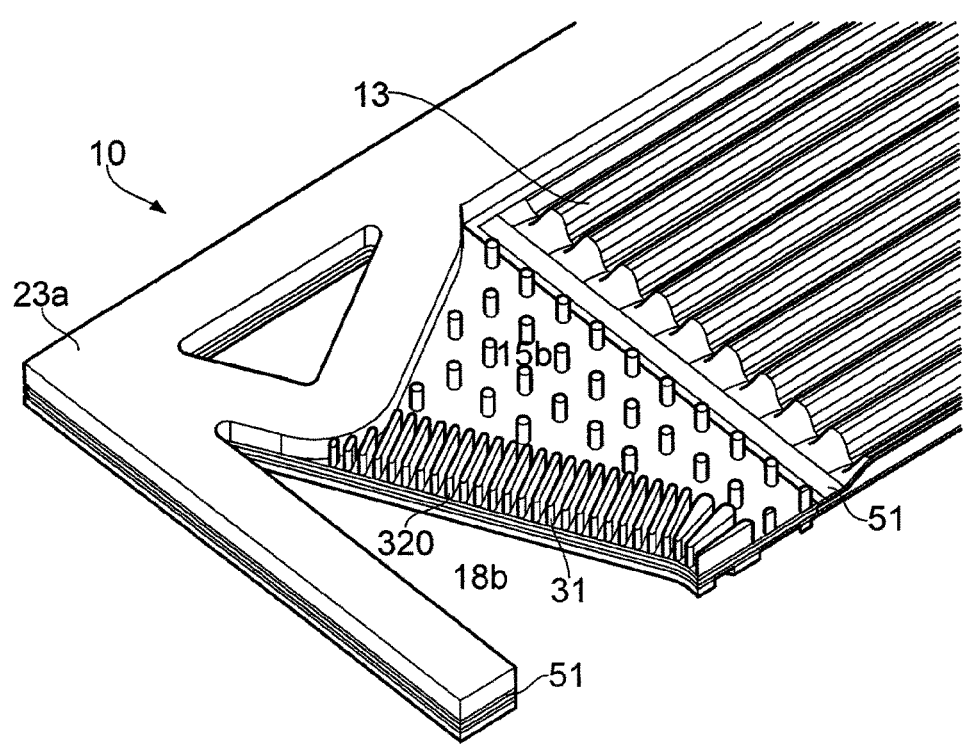
FIG. 8 is a sectional view of a cathode port and manifold connecting to a series of cathode fluid flow channels.

FIG. 8 shows a detailed sectional view of the bipolar plate, illustrating features of the cathode port 18b and cathode manifold 15b. As for the coolant manifold, illustrated in FIG. 5 and described above, the cathode manifold 15b comprises a castellated region 31 formed in the gasket 23a along an edge of the manifold 15b adjoining the cathode port 18b. Cathode fluid (i.e. oxidant and water) entering or exiting the cathode fluid flow field formed by corrugations 13 is directed to or from the port 18b through the castellated region 31, which functions to maintain a separation between the underlying metallic plate 51 and an MEA against which the first face of the bipolar plate is in contact when assembled into a fuel cell stack.

Figure 9:
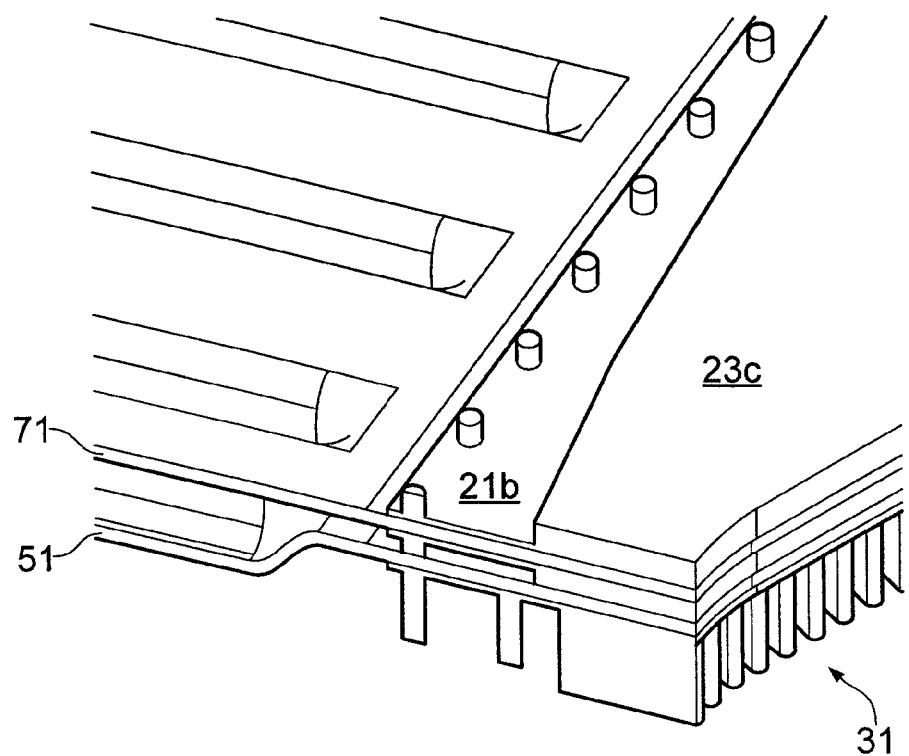
FIG. 9 is a sectional view of an anode manifold connecting to a series of anode fluid flow channels.

FIG. 9 illustrates a detailed sectional view through the anode manifold region 21b, in which a section of the castellated region 31 of the cathode manifold can also be seen. The anode manifold region 21b is typically of smaller thickness than the cathode manifold region 15b, since a greater flow of fluid is required through the cathode fluid flow field than through the anode fluid flow field.

Figure 10:
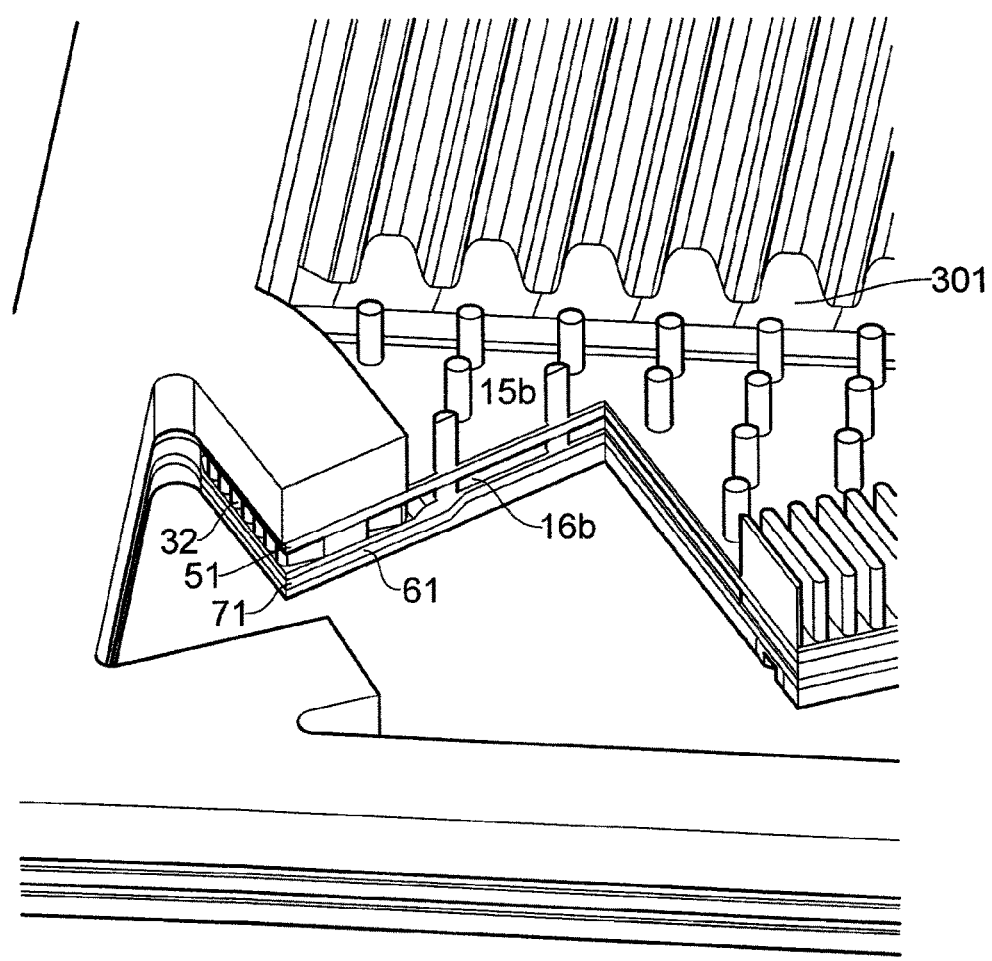
FIG. 10 is a sectional view through a cathode port and cathode manifold.

FIG. 10 illustrates a further sectional view through the cathode manifold region 15b, in which the coolant manifold 16b can be seen sandwiched between the metallic plates 51, 71. The debossed region 61 corresponding to the castellated region 32, described above in relation to FIGS. 5 and 6, can also be seen in this view.

Figure 11A:
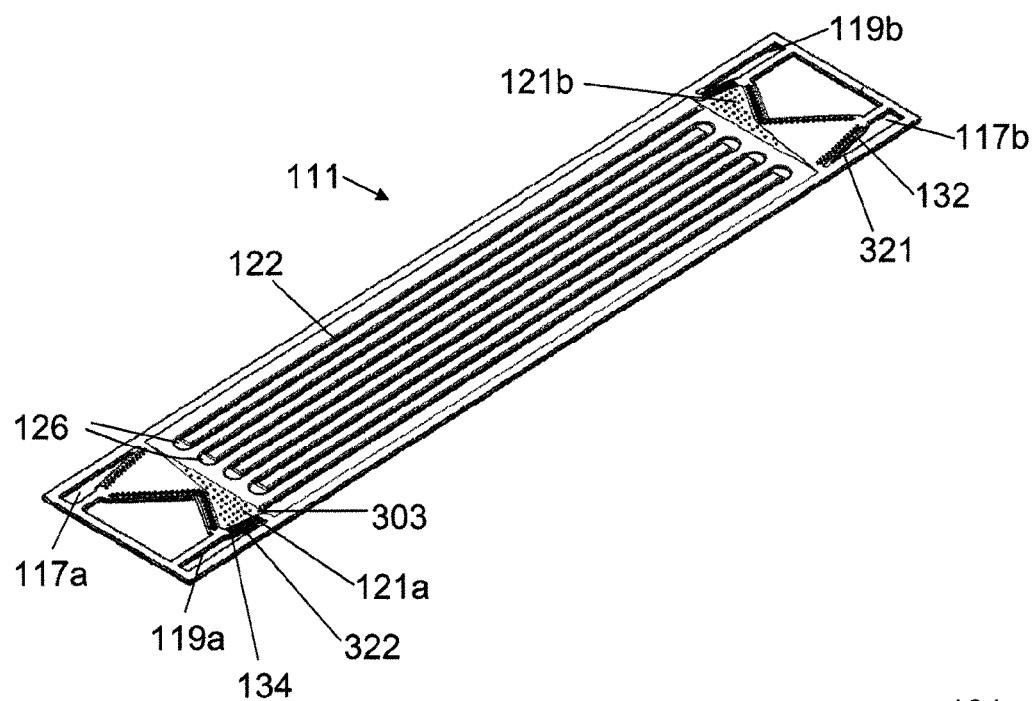
FIG. 11a is a perspective view of an anode side of a bipolar plate.
Figure 11B:
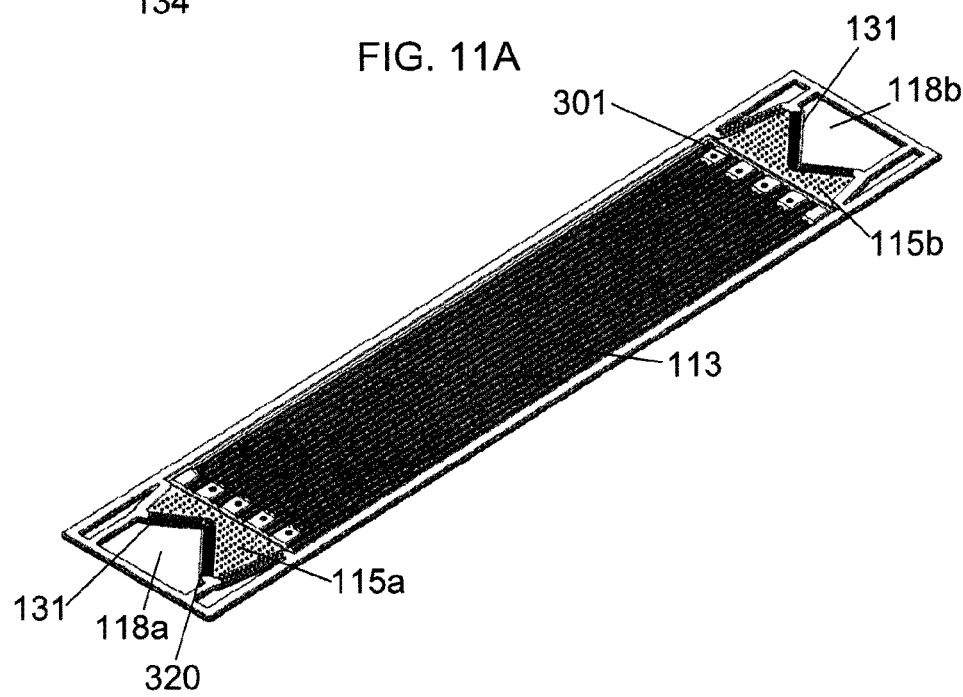

In the above described embodiment, the anode fluid flow field is provided in the form of a plurality of parallel channels formed by corrugations in the first corrugated plate 11. In alternative embodiments the anode fluid flow field in the first corrugated plate may be provided in the form of a serpentine track extending across the first face of the bipolar plate. FIGS. 11a and 11b illustrates such an embodiment, where the bipolar plate 111 comprises a first face (FIG. 11a) having an anode fluid flow field 122 in the form of a single serpentine track extending between anode inlet and outlet ports 119a, 119b and a second face (FIG. 11b) having a cathode fluid flow field 113 in the form of an array of interdigitated corrugations extending between cathode inlet and outlet ports 118a, 118b.

The main differences as compared with the embodiment illustrated in FIGS. 1 to 10 are the inclusion of transverse connecting regions 126 provided at opposing ends of the plate, forming fluid connections between adjacent anode fluid flow channels to allow the anode fluid flow channels to together form a single track between the anode inlet and outlet ports 119a, 119b.

Figure 12A:
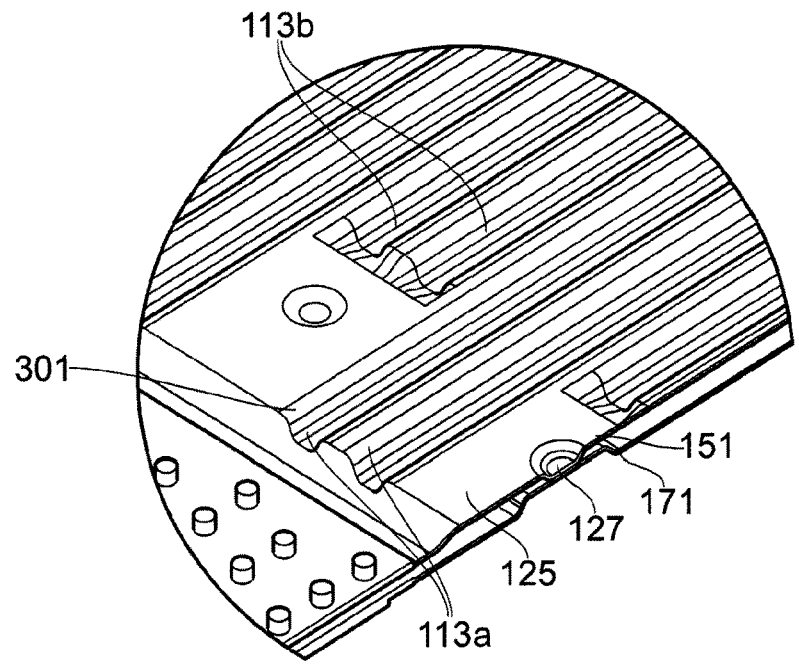
FIG. 12a is a detailed sectional view of a transverse fluid connection region in an assembled bipolar plate.
Figure 12B:
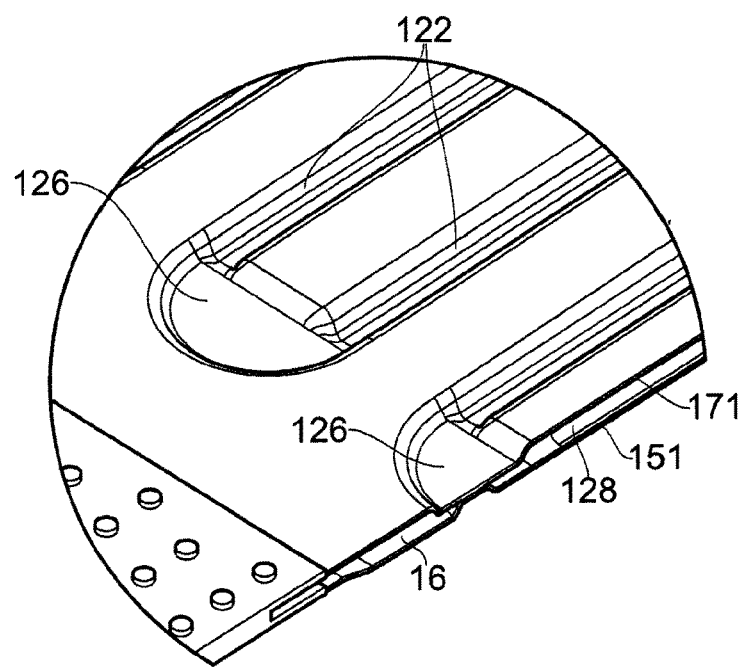
FIG. 12b is an alternative detailed sectional view of a transverse fluid connection region in an assembled bipolar plate.

The transverse connecting regions 126 are illustrated in more detail in FIGS. 12a and 12b, which respectively illustrate detailed sectional views of the second and first faces of the bipolar plate 111 through one such transverse connecting region. A return path is provided by each transverse connecting region 126 to connect adjacent anode fluid flow channels 122. To allow for coolant to pass between the plates 171, 151 between the coolant manifold 16 and each coolant channel 128, each transverse connecting region 126 has a depth that is less than the depth of the adjacent anode channels. Coolant can then pass beneath each transverse connecting region 126 and along the coolant channels 128. To support the connecting regions, a plinth 125 is provided on the cathode fluid flow field, and a point of connection 127 is provided between the metallic plates 151, 171. The point of connection 127 may be a spot weld between the plates 151, 171, serving to maintain the relative position of the plates and transmit pressure through the thickness of the plates 151, 171 without collapsing the return path 126 or the coolant flow field 128 provided between the plates. Each plinth 125 acts as a barrier between a longitudinally adjacent cathode fluid flow channel 113b and an adjacent cathode manifold region 115a, thereby separating the cathode flow channels into inlet channels 113a (connected to the cathode manifold 115a) and exhaust channels 113b (connected to the cathode manifold 115b) and forming the cathode fluid flow field 113 into an array of interdigitated channels. Fluid passing from the cathode inlet port 118a passes across the cathode manifold 115a and into the inlet channels 113a. Fluid then passes along the inlet channels 113a and diffuses through the gas diffusion layer (not shown) and into the outlet channels 113b. Fluid then passes along the cathode outlet channels 113b and along the outlet channels 113b into the outlet manifold 115b and out of the plate 111 through the cathode outlet port 118b.

In a general aspect therefore, the second face of the bipolar plate may comprise a fluid flow field 113 in the form of an array of interdigitated fluid flow channels 113a, 113b formed by corrugations in the second face of the bipolar plate 111. Barriers 125 may be provided at opposing ends of the interdigitated fluid flow channels, each barrier 125 configured to form a fluid seal between an adjacent longitudinal fluid flow channel 113a, 113b and an adjacent inlet or outlet manifold 115b, 115a.

Figure 13:
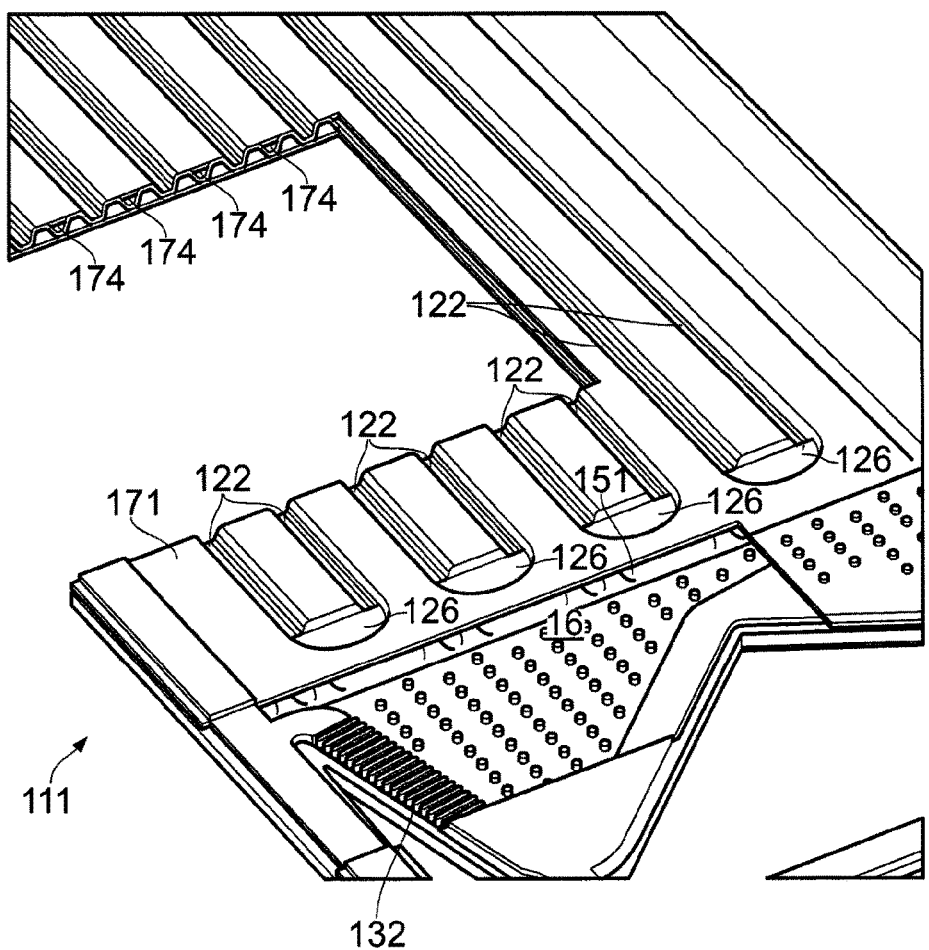
FIG. 13 is a sectional view through a corrugated region and an anode manifold region of a bipolar plate.

FIG. 13 illustrates a cutaway perspective view of a section of the bipolar plate 111, in which the transverse connecting regions 126 are shown connecting adjacent pairs of anode channels 122. Coolant channels 174 can also be seen extending longitudinally between the corrugated plates 151, 171. Each coolant channel 174 extends along the bipolar plate 111 between a pair of adjacent anode channels 122 and connects to the coolant manifold 16 via a gap between the plates 151, 171 beneath a transverse connecting region 126.

Figure 14:
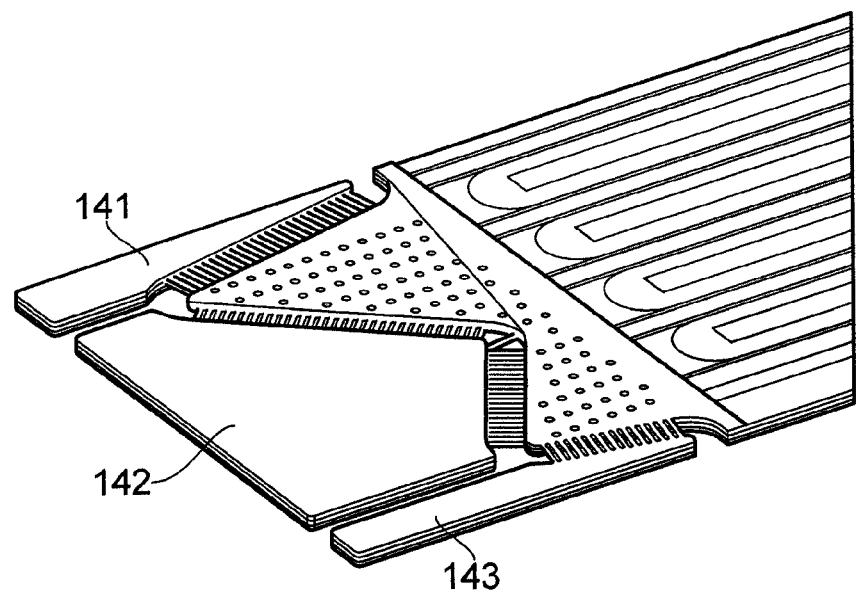
FIG. 14 is an illustration of anode, cathode and coolant fluid volumes within a bipolar plate.
Figure 15:
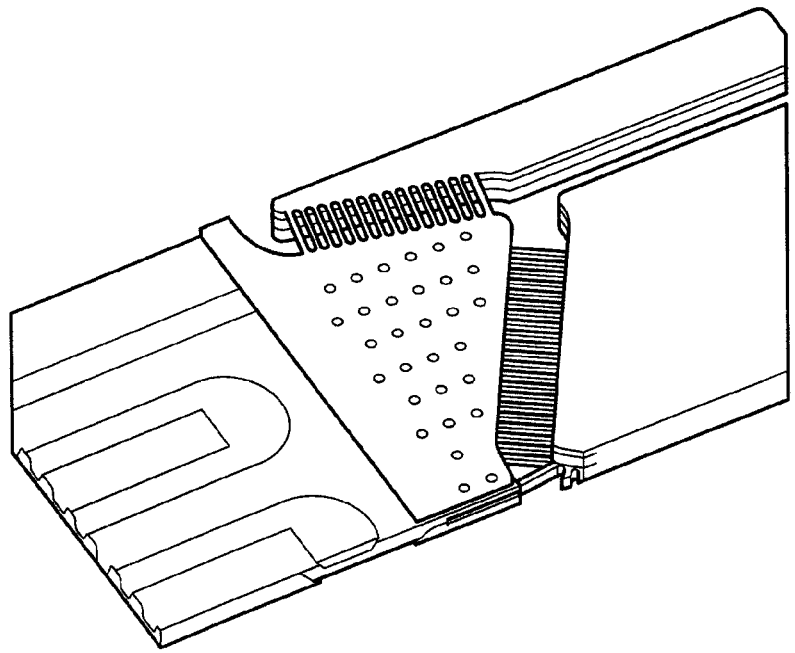
FIG. 15 is a sectional view of the fluid volumes of FIG. 14.

FIG. 14 illustrates a perspective view of the spaces between the plates making up the bipolar plate 111 of FIG. 11, corresponding to a coolant volume 141, a cathode volume 142 and an anode volume 143. A more detailed view of a portion of these volumes is provided in FIG. 15, illustrating sections taken parallel and transverse to the corrugations in the plate. These exemplary views illustrate a general principle according to an aspect of the invention of transferring fluids from the various ports 141, 142, 143 with a minimal pressure drop and with a uniform distribution to each of the fluid flow fields across the bipolar plate. This is achieved by maximising the length of the inlet of each manifold region and by overlapping the manifold regions through the plate. The use of an open array of raised features (described above in relation to FIGS. 3 and 4) allows for the manifold regions to be overlapping while maintaining a separation between adjacent plates to allow for fluid flow in an assembled fuel cell stack. This aspect will be described in detail later.

Figure 16:
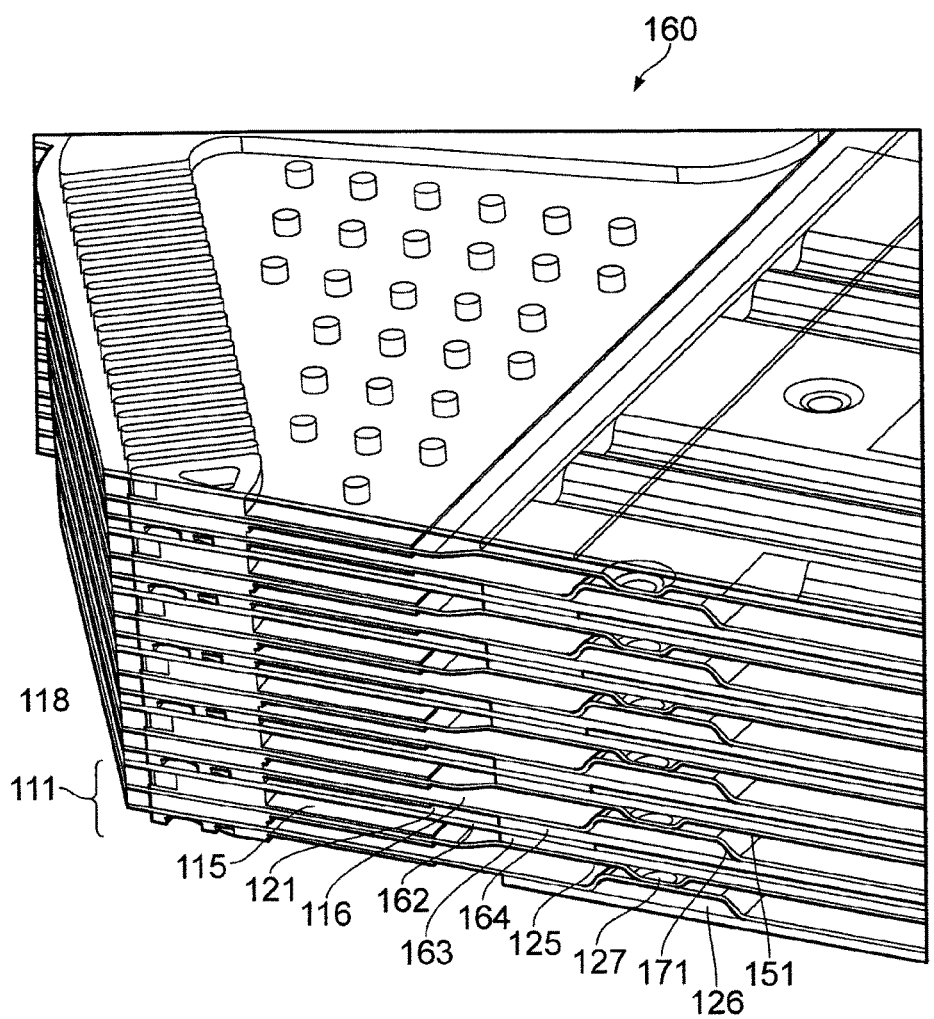
FIG. 16 is a sectional view of a stack comprising five membrane electrode assemblies and six bipolar plates.

FIG. 16 illustrates a sectional view through a fuel cell stack 160 comprising five MEA layers and six bipolar plates 111 of the type illustrated in FIG. 11. In each bipolar plate 111 a cathode plate 151 is bonded to an adjacent anode plate 171 by means of a spot weld 127 connecting the plinth or barrier 125 in the cathode plate 151 with the corresponding transverse connecting region 126 in the anode plate (described above in relation to FIGS. 12a, 12b). Anode and cathode plates in adjacent bipolar plates are separated by a membrane electrode assembly (MEA) 162 having a cathode gas diffusion layer 163 on one face and an anode gas diffusion layer 164 on the other face. The MEA 162 extends beyond the extent of the gas diffusion layers 163, 164, the MEA overlaying the cathode manifold, 115, anode manifold 121 and the coolant manifold 116 between the anode and cathode plates 151, 171. The cathode port 118 is indicated in FIG. 16, connected to the cathode manifold 115 via a castellated region 131 in each bipolar plate making up the stack 160.

Figure 17:
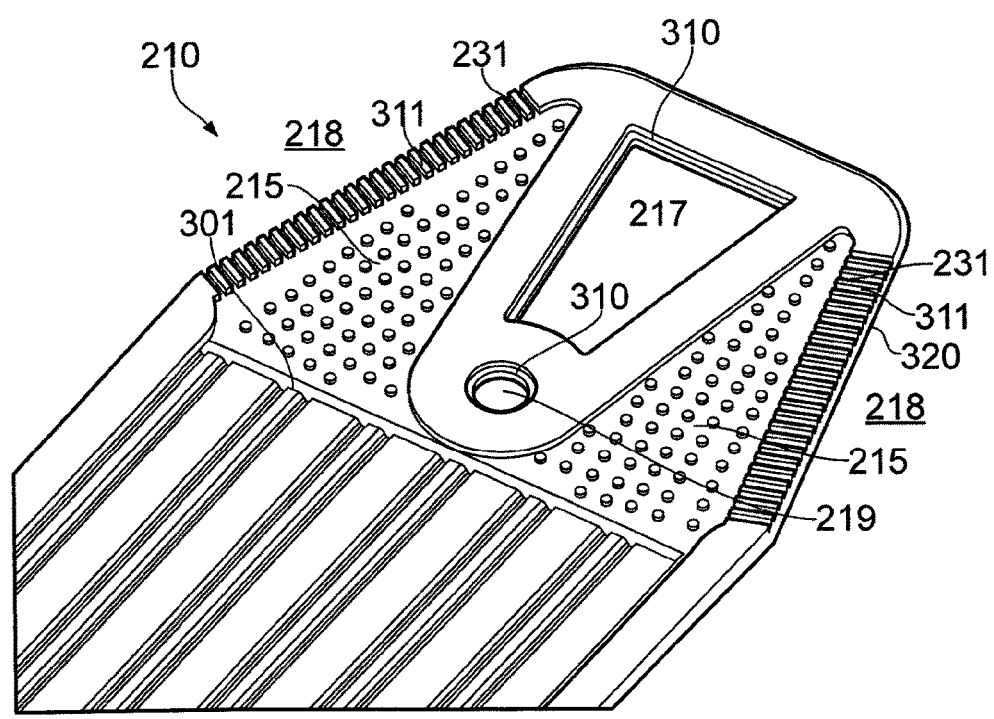
FIG. 17 is a partial perspective view of a cathode face of an alternative embodiment of bipolar plate.
Figure 18:
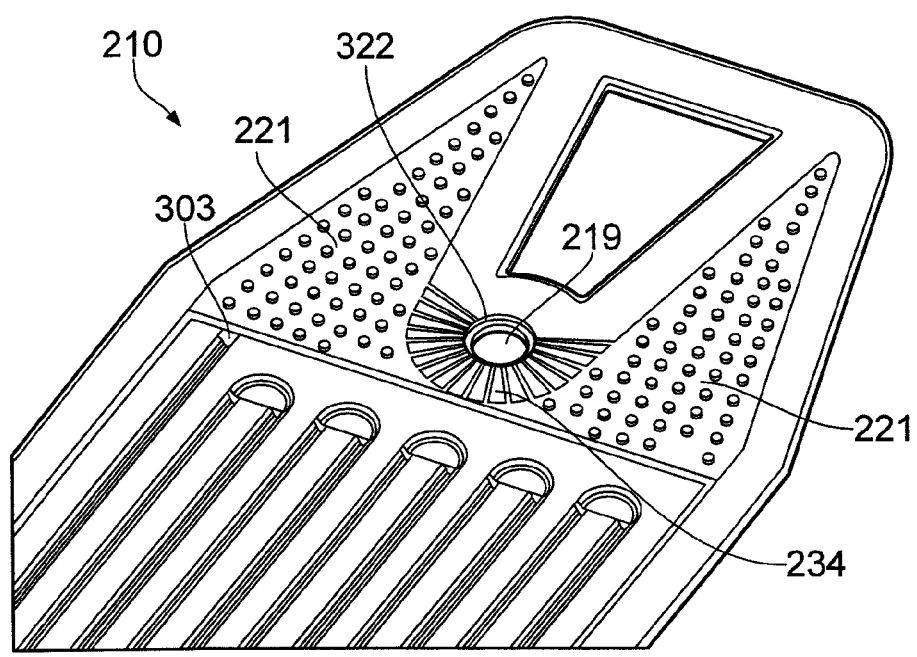
FIG. 18 is a partial perspective view of an anode face of the bipolar plate of FIG. 17.
Figure 19:
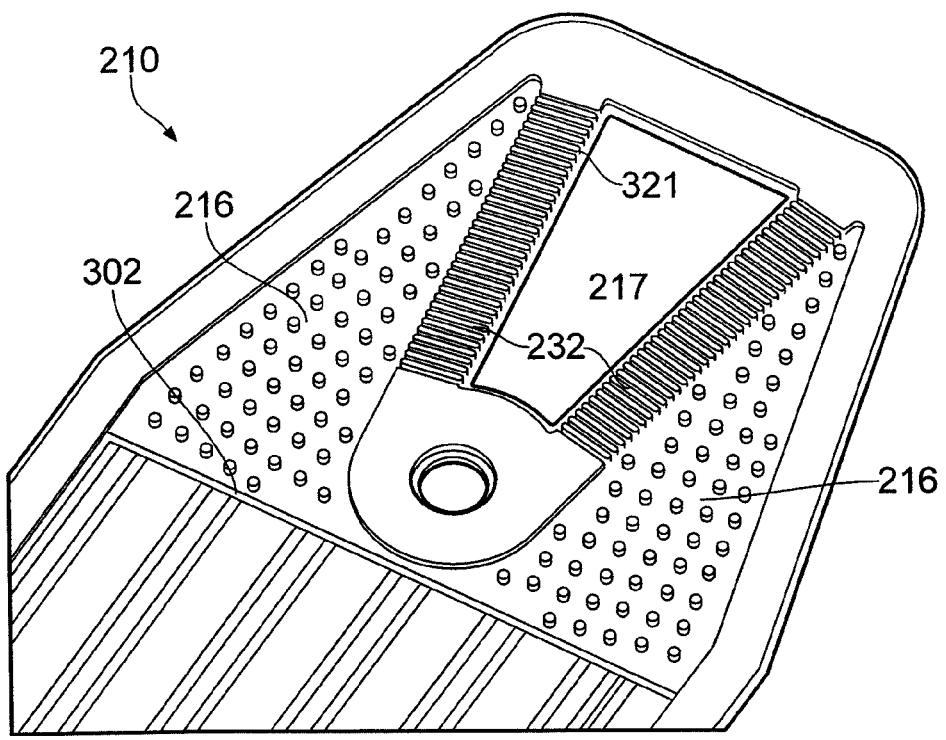
FIG. 19 is a partial perspective view of a coolant manifold on a reverse of the anode face of the bipolar plate of FIGS. 17 and 18.

FIGS. 17, 18 and 19 illustrate a further alternative embodiment of a bipolar plate 210. FIG. 17 shows the cathode face of the plate 210, FIG. 18 the anode face and FIG. 19 the reverse of the anode face indicating the coolant manifold and channels. In this embodiment, the cathode ports 218 are provided by an external enclosure (not shown), which provides an air flow through a pair of cathode air inlets to or from a cathode manifold region 215, the cathode air inlets being provided on an outer periphery or external edge 311 of the bipolar plate 210. As with the embodiments described above, the bipolar plate 210 comprises an anode port 219 in fluid communication with an anode manifold region 221 (shown in FIG. 18), and a coolant port 217 in fluid communication with a coolant manifold region 216 (shown in FIG. 19). The anode, cathode and coolant fluid flow regions across the plate 210 are otherwise similar to the embodiment described above in relation to FIGS. 11 to 16. In this embodiment, the cathode air inlet (or outlet) is configured to be substantially larger in cross-sectional area than either of the coolant or anode inlets or outlets, thereby allowing a greater volume flow rate of air through the plate 210 in use. The anode inlet or outlet, which is defined by the size of the anode port 219, is substantially smaller than either of the cathode or coolant inlets, since the volume of fluid passing in or out of the anode port is smaller.

In a general aspect, according to the embodiment illustrated in FIGS. 17-19 the second inlet and outlet ports 218 are provided on a peripheral edge of the bipolar plate 210, whereas the first and third inlet and outlet ports 219, 217 are provided through the thickness of the bipolar plate 210. An advantage of this arrangement is that the second (cathode) inlet and outlet ports can be made substantially larger, allowing a greater flow of oxidant fluid into and out of the fuel cell made up of a stack of such bipolar plates.

In this embodiment, unlike the embodiments described above in relation to FIGS. 1 to 16 where the manifold regions are partially overlapping, the manifold regions 215, 216, 221 of the plate 210 in FIGS. 17-19 are entirely overlapping due to the cathode port being provided on the periphery of the plate, thereby allowing for a more uniform pressure distribution across the width of the fluid flow regions of the plate 210. The overlapping manifold regions also allows for a more uniform seal to be made around the peripheral edges of each of the manifold regions.

An important feature of embodiments described above is the ability to provide substantially increased lengths of fluid communication edge of the bipolar fluid flow plate.

Firstly, each of the cathode galleries or manifolds 15a, 15b (FIG. 1), 115a, 115b (FIG. 11b), 215 (FIG. 17) can provide fluid communication and distribution between a cathode fluid port 18a, 18b, 118a, 118b, 218 disposed at an end of the flow plate and a set of cathode fluid flow channels 13, across a substantially full width of the flow field active area of the plate defined by those channels.

Secondly, and correspondingly, each of the anode galleries or manifolds 21a, 21b (FIG. 2), 121a, 121b (FIG. 11a), 221 (FIG. 18) can provide fluid communication and distribution between an anode port 19a, 19b, 119a, 119b, 219 disposed at an end of the flow plate and a set of anode fluid flow channels 22, across a substantially full width of the flow field active area of the plate.

Thirdly, and correspondingly, each of the coolant galleries or manifolds 16b (FIGS. 1 and 3), 216 (FIG. 19) can provide fluid communication and distribution between a respective port 17a, 17b, 117a, 117b, 217 disposed at an end of the flow plate and a set of coolant flow channels 14, across a substantially full width of the flow field active area of the plate.

Each of the galleries (e.g. 15, 21, 16) has a first peripheral edge portion bounded by an array of fluid transfer points disposed along an edge of the flow field defined by the flow channels 13, 14, 22. These fluid transfer points are exemplified by the channel ends indicated at 301, 302, 303 respectively for cathode fluid transfer points, coolant fluid transfer points and anode fluid transfer points. Each of the galleries (e.g. 15, 21, 16) also has a second peripheral edge portion disposed along an edge of the flow plate, described herein as a fluid communication edge 320, 321, 322. The fluid communication edge provides for delivery of fluid into the gallery (or egress of fluid from the gallery) by way of the plate edge that forms part of a side wall of the respective port, e.g. cathode fluid ports 18, 18b, 118a, 118b, 218; anode fluid ports 19a, 19b, 119a, 119b, 219; and coolant fluid ports 17a, 17b, 117a, 117b, 217. These fluid communication edges 320, 321, 322 are exemplified by the castellated regions 31, 32, 34, 131, 132, 134.

The first peripheral edge portions of each gallery are generally superposed on one another because the cathode flow channels 13, coolant flow channels 14 and anode flow channels 22 all generally define substantially the same active area, or flow field, of the bipolar plate 10. However, the second peripheral edge portions (e.g. castellated regions 31, 32, 34, 131, 132, 134) may not be superposed on one another as this would conflict with the requirement that the fluid communication edges define parts of the side walls of separate fluid delivery ports extending through the planes of the bipolar plates in the fuel cell stack. For optimal distribution of fluids into the bipolar plate, it is beneficial to have the maximum possible length of second peripheral edge portions 31, 32, 34, 131, 132, 134 for each gallery 15, 21, 16. Thus, there exists a challenge to increase the total length of fluid communication edge of the bipolar plate for any given length of fluid transfer points (i.e. width of the active flow field area).

Each of the embodiments described above achieves a degree of extension of the total length of fluid communication edges 320, 321, 322 (second peripheral edge portions of the galleries) compared with the length of the fluid transfer points (corresponding to the lengths of any of the first peripheral edge portions of the cathode gallery 15, anode gallery 21 or coolant gallery 16).

In the arrangement of FIGS. 1 to 4, it can be seen that the triangular configurations of cathode ports 18, anode ports 19 and coolant ports 17 and their relative positions, together with the corresponding generally triangular shaping of the respective cathode galleries 15, anode galleries 21 and coolant galleries 16 achieves a combined length of second peripheral edge portions 31, 32, 34 that is greater than the length of the first peripheral edge portion (i.e. the active area or flow field width) of any one of the cathode, anode or coolant galleries. In fact, the design sufficiently extends the lengths of the fluid communication edges that the combined length of second peripheral edge portions 31, 32 for the cathode and coolant flows is greater than the length of the first peripheral edge portion of any of the cathode gallery 15, anode gallery 21 or coolant gallery 16.

In the arrangement of FIGS. 11a and 11b, it can be seen that the ports 117, 118, 119 are extended to provide greater volume, but each includes at least one edge portion (e.g. castellated region 131, 132, 134) which is oblique to the first peripheral edge portion (e.g. at fluid transfer points 301, 302, 303), thereby providing each of the galleries 115, 121, 116 with at least one portion which is generally triangular in shape. In these galleries, the first peripheral edge portion may form the base of a triangle, while the second peripheral edge portion may form a side of the triangle. Other more complex shapes are possible.

It will also be noted from FIG. 11a that if the anode flow field 122 is provided as a single serpentine channel extending from a single channel opening at each end of the plate, there will only be a single fluid transfer point 303 and no need to extend the anode gallery 121 across the full flow field 122 width and it may not be necessary to have an anode gallery. However, the principles described with respect to an anode gallery 121 having a first peripheral edge portion extending across the width of the anode flow field can still apply where multiple serpentine channels are provided.

In a general aspect, the total length of fluid communication edges 320, 321, 322 can be achieved by presenting at least one, and preferably more than one, of the second peripheral edge portions of one or more of the galleries 15, 21, 16 at an oblique angle to the first peripheral edge portions of the galleries.

In another aspect, the total length of fluid communication edges can be increased further by using both internal and external edges of the bipolar plate to form fluid communication edges. It can be seen that the exemplary arrangements in FIGS. 1 to 4 and FIGS. 11a and 11b each provide fluid communication edges defined on an internal edge of the plate, i.e. an edge of the plate defined within a hole or aperture passing through the plate 10, 111. In the arrangement of FIGS. 17 to 19, an even greater length of fluid communication edge is provided by using both internal and external edges of the plate.

Coolant fluid port 217 and anode fluid port 219 both define internal edges 310 of the bipolar plate 210. However, cathode fluid is delivered by an external edge 311 where the fluid is constrained within a cathode port 218 by an external enclosure discussed earlier. In this type of arrangement, a flow field width (i.e. the length of first peripheral edge portion or plate width across all channels) of 40 mm has been provided with a corresponding total port length (i.e. total length of second peripheral edge portions for all galleries) of 120 mm. This is made up of a cathode port 218 castellated region 231 of 60 mm, an anode port 219 castellated region 234 of 20 mm (circumferential) and a coolant port 217 castellated region 232 of 40 mm. Thus, the ratio of fluid communication edge (total of all second peripheral edge portions) to flow field width (first peripheral edge portion) of at least 2:1 and preferably 3:1 or more is possible in this arrangement. More generally the ratio of fluid communication edge (second peripheral edge portion) of one gallery to the first peripheral edge portion of the gallery can be 1.2:1 or even as high as 1.5:1 in the example of FIGS. 17-19.

In preferred arrangements, the ratio of fluid communication edges for each of the cathode:anode:coolant is preferably of the order of 50%:16%:34%. However, other ratios can be selected according to the design parameters of the fuel cell stack. The castellated structures 31, 32, 34, 131, 132, 134 can provide any suitable aspect ratio of open to closed to optimise flow rates versus supporting strength against compression of the gasket layers, but a 50%:50% aspect ratio is found to be optimal with certain designs.

In practice, it is often found that cathode fluid flows and coolant fluid flows are the largest and/or most critical and therefore maximizing the lengths of fluid communication edges for the cathode and coolant galleries at the expense of reduced fluid communication edges for the anode galleries can be beneficial.

Another important feature of the embodiments described above is the ability to feed two or three different fluids into two or more of coplanar anode, cathode and coolant channels 72, 73, 74 (FIG. 7) or 22, 13, 14 (FIGS. 1 and 2). Fluids are delivered to a stack of plates 10 by ports passing through the planes of the plates. These ports are seen in FIGS. 1 and 2 comprising anode ports 19a, 19b, cathode ports 18a, 18b and coolant ports 17a, 17b. Thus, if the plane of the plate 10 is said to lie in an x-y plane, the ports all extend in the z-direction but are spatially separated from one another in the x-y plane. The galleries delivering fluids should preferably all extend across the full width (x-direction) of the flow field of the plates, while being separated at their fluid communication edges with the ports 17, 18, 19. This can be achieved by providing three different levels, or planes, of galleries all of which occupy one common level, or plane, of the coplanar anode, cathode and coolant channels. The expression "plane" or "level" in this context is intended to specify a finite space along the z-dimension. The anode channels 72, cathode channels 73 and coolant channels 74 occupy a common plane, level or "z-space" referred to as the channel plane. The anode gallery 21a, 21b, 121a, 121b, 221 occupies a thinner plane within the channel plane, but different from a plane occupied by the cathode gallery 15a, 15b, 115a, 115b, 215. The coolant gallery 16b, 216 occupies a plane within the channel plane but different from either the anode gallery plane and the cathode gallery plane.

With reference to FIG. 8, it can be seen that the cathode gallery 15b has an array of first fluid transfer points 301 where it meets the ends of the cathode fluid flow channels 13 at the edge of the cathode fluid flow field defined by the channels 13. This can be considered to be a first peripheral edge portion of the gallery which extends across the flow field width. The cathode gallery 15b also has a second peripheral edge portion defined by the castellated region 31 which forms a fluid communication edge 320 by which cathode fluid can flow between the cathode port 18b and the cathode gallery 15b.

With further reference to FIG. 5, it can be seen that the coolant gallery 16b has an array of fluid transfer points 302 where it meets the ends of the coolant fluid flow channels 14 at the edge of the coolant fluid flow field defined by the channels 14. This can be considered to be a first peripheral edge portion of the coolant gallery 16b which extends across the flow field width. The coolant gallery 16b also has a second peripheral edge portion defined by the castellated region 32 which forms a fluid communication edge 321 by which coolant fluid can flow between the coolant port 17b and the coolant gallery 16b.

With further reference to FIG. 4, it can be seen that the anode gallery 21b has an array of fluid transfer points 303 where it meets the ends of the coolant fluid flow channels 22 at the edge of the coolant fluid flow field defined by the channels 22. This can be considered to be a first peripheral edge portion of the anode gallery 21b which extends across the flow field width. The anode gallery 21b also has a second peripheral edge portion defined by the castellated region 34 which forms a fluid communication edge 322 by which anode fluid can flow between the anode port 19b and the anode gallery 21b.

Similar examples of the cathode fluid communication edge 320, the coolant fluid communication edge 321 and the anode fluid communication edge 322 are also shown in FIGS. 17 to 19. It will be seen that each of these communication edges occupies a slightly different z-position and forms part of the wall of the respective anode port, cathode port and coolant port.

Figure 20:
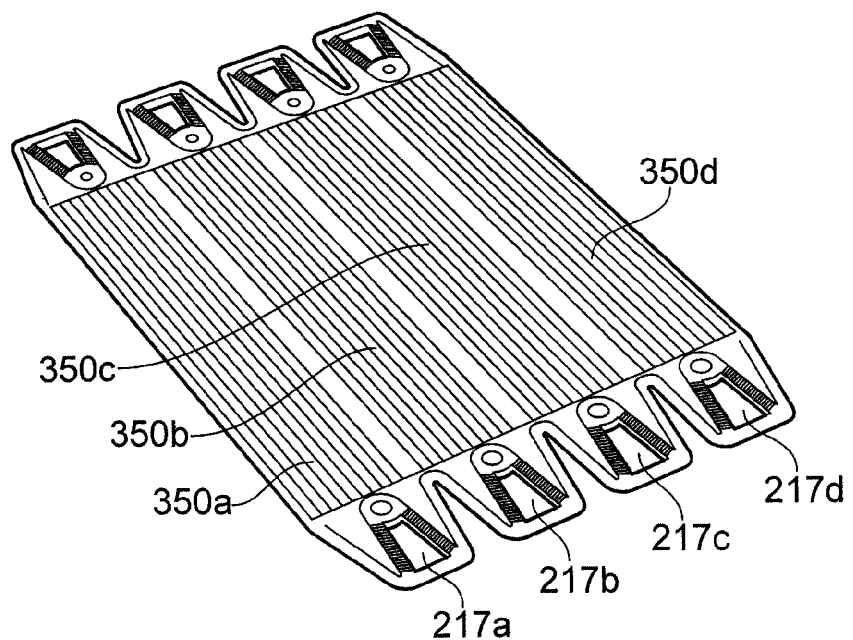
FIG. 20 is a perspective view of a multi-plate assembly of the bipolar plates of FIGS. 17-19.

FIG. 20 shows an arrangement in which multiple plates 350a, 350b, 350c, 350d can be formed side-by-side from a single sheet of material. The side-by-side configuration can be used to form extra wide plates split into different flow field regions each served by its own respective set of cathode, anode and coolant ports (e.g. coolant ports 217a-217d), and its own respective set of anode, cathode and coolant galleries. Alternatively, the side-by-side configuration can be used to form plates 350a, 350b connected by a fold line as discussed earlier, such that adjacent plates 350a, 350b respectively comprise an anode plate and a cathode plate which can be folded over one another to create the bipolar plate.

The embodiments shown in the figures all relate to bipolar plates in which an anode flow field (defined by channels 22) is provided on one face of the plate 10 and a cathode fluid flow field (defined by channels 13) is provided on another face of the pate, while a coolant fluid flow field (defined by channels 14) is provided within the plate. The principles of extending the combined lengths of second peripheral edge portions 31, 32, 34 of at least two of the fluid galleries 15, 16, 21 compared to the length of the first peripheral edge portion (bounded by the fluid transfer points 301, 302 or 303) can also be deployed in a monopolar plate, e.g. where only a cathode flow field and a coolant flow field is required. In such circumstances the anode flow field could be provided by a separate plate.

Similarly, the principles of disposing at least two second peripheral edge portions 31, 32, 34 at oblique angles to the first peripheral edge portion (bounded by the fluid transfer points 301, 302 or 303) to provide a total length of the array of second fluid transfer points that is at least as long as, and preferably longer than, the length of the array of first fluid transfer points can also be deployed in a monopolar plate, e.g. where only a cathode flow field and a coolant flow field is required. In such circumstances the anode flow field could be provided by a separate plate.

Similarly, the principles of providing a first fluid gallery which occupies a first gallery plane and a second fluid gallery which occupies a second gallery plane different from the first gallery plane, and in which both the first gallery plane and the second gallery plane are disposed within a channel plane can be deployed in a monopolar plate where the first and second fluid galleries are to supply cathode fluid and coolant fluid. In such circumstances the anode flow field could be provided by a separate plate.

Other embodiments are intentionally within the scope of the invention as defined by the appended claims.

The invention claimed is:

1. A bipolar plate for an electrochemical fuel cell assembly, comprising:
   a first plurality of fluid flow channels extending across a first face of the bipolar plate between first inlet and outlet ports at opposing ends of the bipolar plate;
   a second plurality of fluid flow channels extending across a second opposing face of the bipolar plate between second inlet and outlet ports at opposing ends of the bipolar plate;
   a third plurality of fluid flow channels extending between third inlet and outlet ports at opposing ends of the bipolar plate, the third plurality of fluid flow channels provided between first and second corrugated plates forming the first and second opposing faces of the bipolar plate, respectively;
   first inlet and outlet manifolds across the first face of the bipolar plate providing respective fluid connections between the first inlet and outlet ports and the first plurality of fluid flow channels; and
   a first gasket forming a fluid seal around a periphery of the first face of the bipolar plate and the first inlet and outlet ports and forming the first inlet and outlet manifolds,
   the first inlet and outlet manifolds each comprising an open array of raised features formed in the first gasket configured to provide a defined separation between the bipolar plate and an adjacent layer while allowing flow of fluid between the first inlet and outlet ports and the first plurality of fluid flow channels; and
   the first inlet and outlet manifolds minimize a pressure difference across the flow of fluid and maximize areas of the inlet and outlet ports which are non-nested;
   wherein the first, second and third channels are coplanar;
   wherein adjacent pairs of the first plurality of fluid flow channels are connected at opposing ends of the bipolar plate to form a single serpentine fluid flow path extending across the first face of the bipolar plate between the first inlet and outlet ports;
   wherein each adjacent pair of the first plurality of fluid flow channels are connected by one of a plurality of transverse connecting regions extending between adjacent corrugations in the first corrugated plate, with each of the transverse connection regions having a depth less than the depth of the adjacent pair of first plurality of fluid flow channels.

2. The bipolar plate of claim 1 wherein the first and second corrugated plates are engaged with each other such that selected corrugations in the first plate lie within corresponding corrugations in the second plate.

3. The bipolar plate of claim 2 wherein the third plurality of fluid flow channels are formed between the first and second corrugated plates by omission of selected corrugations in the first or second plate.

4. The bipolar plate of claim 2 wherein the third plurality of fluid flow channels are formed between the first and second corrugated plates by narrowing of selected corrugations in the first or second plate.

5. The bipolar plate of claim 2 wherein the third plurality of fluid flow channels are formed between the first and second corrugated plates by a height reduction of selected corrugations in the first or second plate.

6. The bipolar plate of claim 1 wherein the second fluid flow channels form an array of interdigitated fluid flow channels.

7. The bipolar plate of claim 6 wherein the second face comprises barriers formed in the second corrugated plate at opposing ends of the interdigitated fluid flow channels, each barrier configured to form a fluid seal between an adjacent longitudinal fluid flow channel and an adjacent one of the second inlet and outlet ports.

8. A method of manufacturing a bipolar plate for an electrochemical fuel cell assembly, the method comprising:
press-forming a first metallic plate to form first second and third inlet and outlet ports at opposing ends and a plurality of corrugations to provide a first plurality of fluid flow channels extending across the first metallic plate between the first inlet and outlet ports;
press-forming a second metallic plate to form first second and third inlet and outlet ports at opposing ends and a plurality of corrugations to provide a second plurality of fluid flow channels extending across the second metallic plate between the second inlet and outlet ports;
joining the first and second metallic plates to form a bipolar plate having a third plurality of fluid flow channels between adjoining faces of the first and second metallic plates extending between the third inlet and outlet ports at opposing ends of the bipolar plate;
forming first inlet and outlet manifolds across the first face of the bipolar plate providing respective fluid connections between the first inlet and outlet ports and the first plurality of fluid flow channels using a first gasket to form a fluid seal around a periphery of the first face of the bipolar plate and the first inlet and outlet ports and to form the first inlet and outlet manifolds,
the first inlet and outlet manifolds each comprising an open array of raised features formed in the first gasket configured to provide a defined separation between the bipolar plate and an adjacent layer while allowing flow of fluid between the first inlet and outlet ports and the first plurality of fluid flow channels;
the first inlet and outlet manifolds minimize a pressure difference across the flow of fluid and maximize areas of the non-nested inlet and outlet ports;
wherein the first, second and third fluid flow channels are coplanar;
wherein the press-forming of the first metallic plate forms the first plurality of fluid flow channels such that adjacent pairs of the first plurality of fluid flow channels are connected at opposing ends of the bipolar plate to form a single serpentine fluid flow path extending across the first face of the bipolar plate between the first inlet and outlet ports;
wherein the press-forming of the first metallic plate further comprises press-forming a plurality of transverse connecting regions, wherein each adjacent pair of the first plurality of fluid flow channels are connected by one of the plurality of transverse connecting regions extending between adjacent corrugations in the first metallic plate, with each of the transverse connection regions having a depth less than the depth of the adjacent flow channels in the first plurality of fluid flow channels.

9. The method of claim 8 wherein the steps of press-forming the first and second metallic plates are performed simultaneously on a common metallic plate.

10. The method of claim 9 comprising forming a fold line between the first and second metallic plates, and wherein the step of joining the first and second metallic plates comprises folding the common metallic plate along the fold line.

11. The bipolar plate of claim 7, wherein each of the barriers in the second corrugated plate is bonded to a corresponding transverse connecting region in the first corrugated plate.

* * * * *